(12) United States Patent
Sarashina

(10) Patent No.: US 9,866,347 B2
(45) Date of Patent: Jan. 9, 2018

(54) BAND CONTROL SYSTEM, BAND CONTROL APPARATUS AND COMMUNICATION APPARATUS

(71) Applicant: Oki Electric Industry Co., Ltd., Tokyo (JP)

(72) Inventor: Masahiro Sarashina, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 15/374,034

(22) Filed: Dec. 9, 2016

(65) Prior Publication Data

US 2017/0250777 A1  Aug. 31, 2017

(30) Foreign Application Priority Data

Feb. 25, 2016  (JP) .................................. 2016-034749

(51) Int. Cl.
*H04J 14/08* (2006.01)
*H04W 56/00* (2009.01)
(Continued)

(52) U.S. Cl.
CPC .......... *H04J 14/08* (2013.01); *H04Q 11/0067* (2013.01); *H04W 56/0015* (2013.01);
(Continued)

(58) Field of Classification Search
CPC ....... H04Q 11/0067; H04Q 2011/0086; H04Q 11/0005; H04Q 2011/0045;
(Continued)

(56) References Cited

U.S. PATENT DOCUMENTS

2014/0301734 A1* 10/2014 Fang .................... H04J 14/005
398/76
2017/0164215 A1* 6/2017 Chen .................... H04W 24/02

OTHER PUBLICATIONS

Shigeru Kuwano et al., "Low-Latency DBA for Mobile Optical Network Based on TDM-PON System", General Conference of the Institute of Electronics, Information and Communication Engineers, B-8-54, pp. 326, Mar. 18-21, 2014.

* cited by examiner

*Primary Examiner* — Ted Wang
(74) *Attorney, Agent, or Firm* — Rabin & Berdo, P.C.

(57) ABSTRACT

A band control system, a band control apparatus and a communication apparatus which realize low-latency band allocation assuming a plurality of radio control units are proposed.

The band control system according to the present invention is a band allocation control system for optical communication which performs connection between a plurality of radio transmitting/receiving units connected to radio terminals and a plurality of radio control units corresponding to the plurality of radio transmitting/receiving units. Each of the radio control units includes a radio communication timing calculating unit configured to calculate a radio communication timing of each of the radio terminals in a connection network. The band control system includes a band allocation control unit configured to allocate an optical communication band according to the radio communication timing calculated by the radio communication timing calculating unit of each of the radio control units to each of a plurality of slave station apparatuses corresponding to the radio transmitting/receiving units, and a synchronization control unit configured to control synchronization among the plurality of radio control units.

16 Claims, 14 Drawing Sheets

(51) Int. Cl.
*H04W 72/04* (2009.01)
*H04Q 11/00* (2006.01)
*H04W 88/08* (2009.01)

(52) U.S. Cl.
CPC  *H04W 72/0453* (2013.01); *H04Q 2011/0086* (2013.01); *H04W 88/085* (2013.01)

(58) Field of Classification Search
CPC ........... H04Q 2011/002; H04Q 11/0066; H04J 14/08; H04W 56/0015; H04W 72/0453
See application file for complete search history.

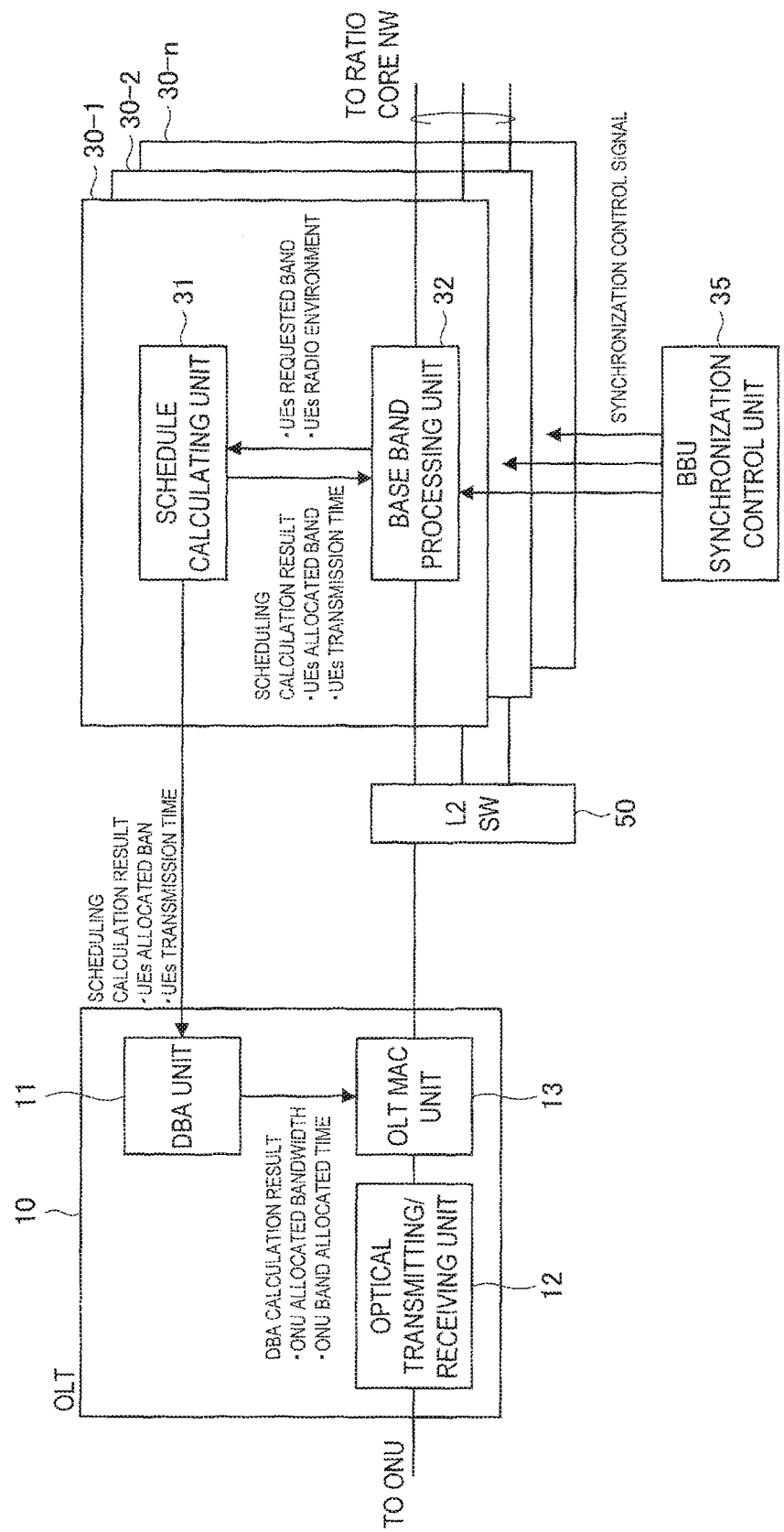

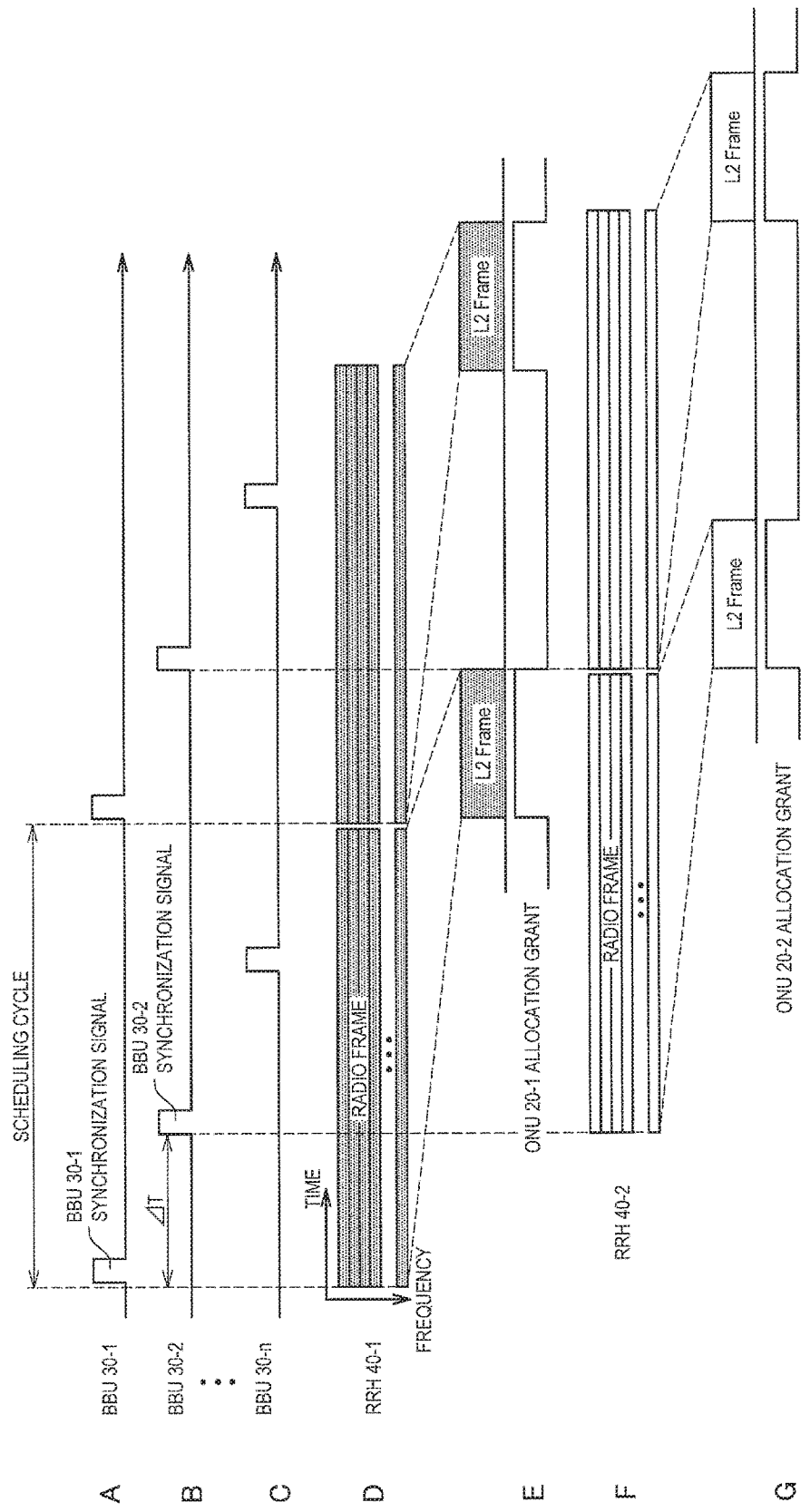

BAND CONTROL SYSTEM, BAND CONTROL APPARATUS AND COMMUNICATION APPARATUS

CROSS REFERENCE TO RELATED APPLICATION(S)

This application is based upon and claims benefit of priority from Japanese Patent Application No. 2016-034749, filed on Feb. 25, 2016, the entire contents of which are incorporated herein by reference.

BACKGROUND

The present invention relates to a band control system, a band control apparatus and a communication apparatus, and for example, can be applied to a band control system, a band control apparatus and a communication apparatus which use a time division multiplex-passive optical network (TDM-PON) system.

In recent years, in order to accommodate rapidly increasing mobile traffic, a configuration has been studied in which a number of radio base stations (also referred to as so-called "small cells") having narrower cover areas than that of a radio base station in related art are provided to improve throughput per unit area.

The small cell is configured with a base band processing unit (base band unit (BBU)) and a remote radio transmitting/receiving unit (remote radio head (RRH)).

The BBU modulates a packet signal from an upper network and transmits the modulated signal to the RRH, or demodulates a signal from the RRH to packetize the signal and transmits the packetized signal to the upper network. Further, the RRH transmits a signal from an antenna connected in a subsequent stage to user equipment (UE), or transmits a signal received from the UE to the BBU.

As connection between the BBU and the RRH, in order to efficiently provide a number of small cells, a centralized radio access network (C-RAN) configuration is implemented in which a plurality of BBUs are integrated into one unit and each BBU is connected to an RRH on a one-to-one basis using an optical fiber.

However, because this C-RAN configuration requires optical fibers in proportion to increase of the number of small cells, cost required for maintaining and laying optical fibers becomes a problem in a small cell connection method in the future.

Therefore, as an economical connection method of a mobile front haul (MFH) (between the BBU and the RRH), utilization of TDM-PON is considered (see Shigeru Kuwano, and others, "Low-Latency DBA for Mobile Optical Network Based on TDM-PON System", General Conference of the Institute of Electronics, Information and Communication Engineers, 2014, B-8-54 (Non-Patent Literature 1)).

Because, in the TDM-PON, one star-shaped optical fiber is shared among users in time division, it is possible to suppress the required number of optical fibers. Further, because star-shaped optical fibers for FTTH service have been already widely laid in Japan, it is possible to reduce cost for laying optical fibers if unused fibers are utilized.

SUMMARY

In the above-described technology disclosed in Non-Patent Literature 1, the number of BBUs is one. However, in an actual system configuration, the number of BBUs corresponding to the number of RRHs connected to the PON is required. In such an actual system configuration, when the low-latency DBA of Non-Patent Literature 1 is applied, there is a problem that synchronization operation among the BBUs is not considered.

Therefore, the present invention has been made in view of the above-described problem and proposes a band control system, a band control apparatus and a communication apparatus which realize low-latency band allocation assuming a plurality of BBUs.

A band control system which controls a communication band between a plurality of radio transmitting/receiving units configured to transmit/receive radio signals and a plurality of radio control units, includes a band allocation control unit (1) and a synchronization control unit (2). Communication between one or more optical communication terminals connected to the radio transmitting/receiving units and an optical communication managing apparatus which manages the one or more optical communication terminals is optical communication. The radio transmitting/receiving units each perform radio communication with one or more radio terminals. The radio control units are each associated with the one or more radio transmitting/receiving units. The radio control units each include a radio communication timing calculating unit configured to calculate a timing at which the one or more radio transmitting/receiving units perform radio communication. The band allocation control unit (1) obtains optical communication bands according to the timings for the radio communication and allocates the optical communication bands to the one or more optical communication terminals corresponding to the one or more radio transmitting/receiving units. The synchronization control unit (2) performs control in a manner that processing of the plurality of radio control units is synchronized with each other.

According to the present invention, it is possible to realize low-latency band allocation assuming a plurality of BBUs.

BRIEF DESCRIPTION OF THE DRAWINGS

FIG. 3 is a configuration diagram illustrating a main internal configuration of an OLT and each BBU according to the first embodiment;

FIG. 4 is a timing chart illustrating communication processing in the communication system according to the first embodiment;

DETAILED DESCRIPTION OF THE EMBODIMENT(S)

Figure 1:
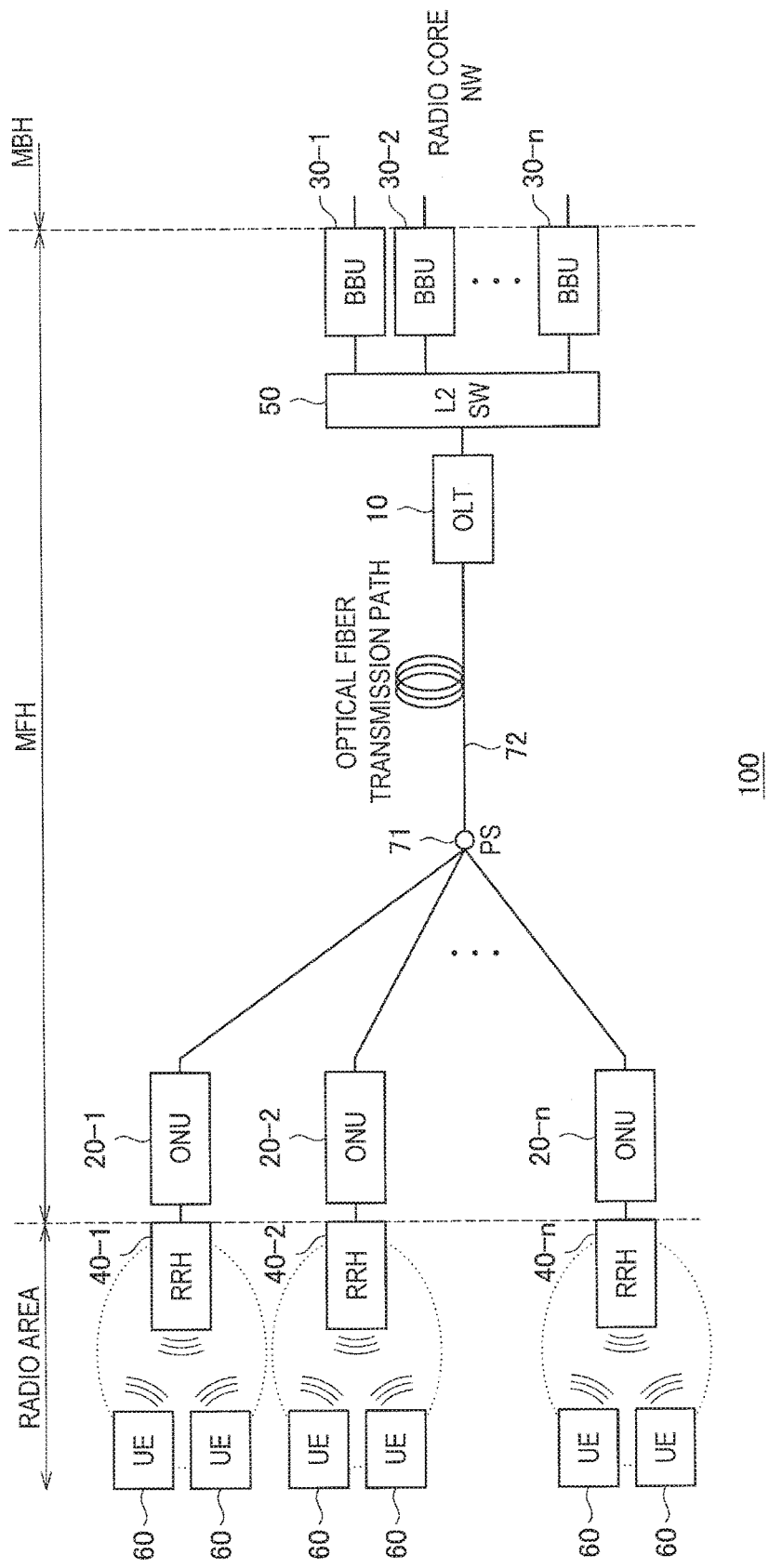
FIG. 1 is a configuration diagram illustrating an overall configuration of a communication system according to a first embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) First Embodiment

A first embodiment of a band control system, a band control apparatus and a communication apparatus according to the present invention will be described in detail below with reference to the drawings.

(A-1) Gist of First Embodiment

It is proposed to apply a TDM-PON system to an MFH of a radio system such as a mobile access network.

In the PON system, in order to fairly and efficiently allocate bands to respective users, a dynamic bandwidth allocation (DBA) scheme is applied which collects a band amount required by each user for each predetermined period and adjusts a band to be allocated.

Generally, this band allocation cycle is set at approximately 1 ms. When transmission data occurs at an optical network unit (ONU), an optical line terminal (OLT) allocates a band based on a band required by the ONU. A period until when transmission of the above-described transmission data is started is approximately 1.5 ms on average.

However, because a delay period required at the MFH of the radio system is equal to or less than several hundred μs, with the DBA scheme in related art, it is difficult to satisfy this delay period.

In order to solve the above-described problem, Non-Patent Literature 1 proposes a low-latency DBA scheme in which a scheduling (radio band allocation) result at the BBU is monitored at the OLT, time at which uplink data from the RRH arrives at the ONU is recognized in advance and a band is allocated to each ONU so as to match the time. With this scheme, it is possible to suppress a transmission delay period to equal to or less than several ten μs.

However, in the technology described in Non-Patent Literature 1, the number of BBUs is one. In an actual system configuration, the number of BBUs corresponding to the number of RRHs connected to the PON is required. Therefore, because synchronization operation among BBUs is not considered in the technology described in Non-Patent Literature 1, uplink data occurs at each ONU at different time when TDMA is performed in a PON section.

Figure 2A:
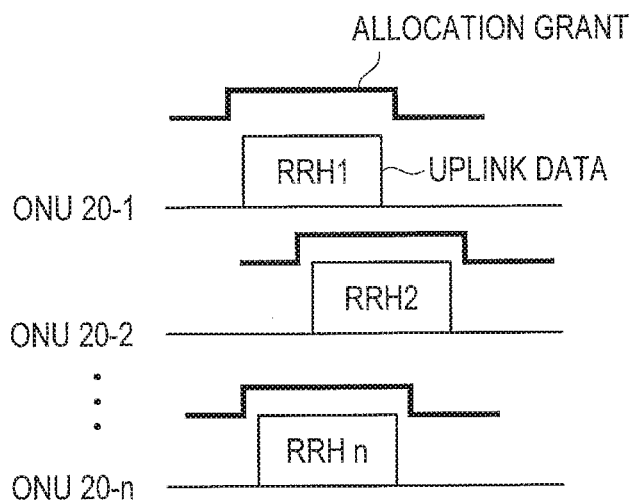
FIG. 2A is an explanatory diagram explaining problems to be solved by a band control system according to the first and second embodiments.
Figure 2B:
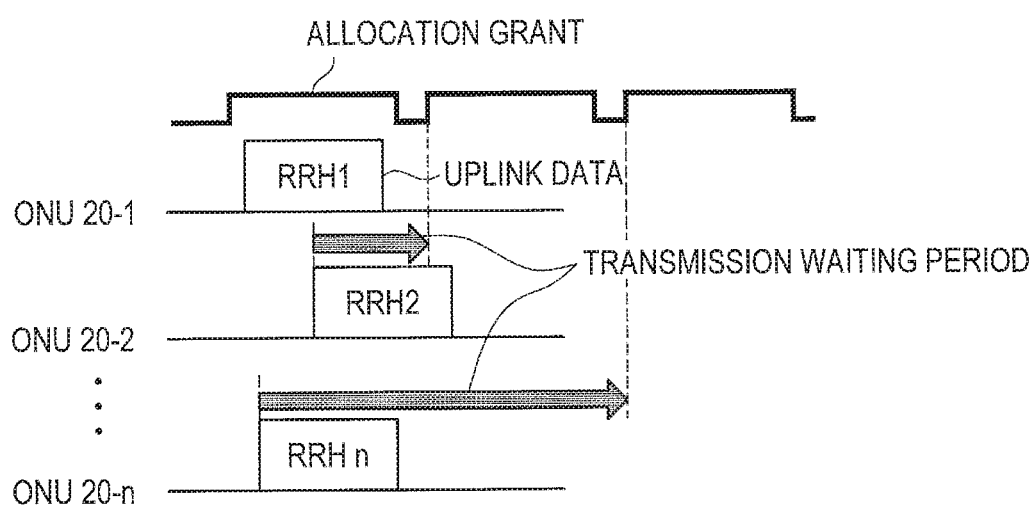
FIG. 2B is an explanatory diagram explaining problems to be solved by the band control system according to the first and the second embodiments.

For example, as illustrated in FIG. 2A, it is predicted that allocation grants overlap with each other among ONUs 20-1 to 20-$n$. Further, as illustrated in FIG. 2B, also when uplink data is sequentially transmitted, because start time of an allocation grant is not taken into account, it is predicted that a transmission waiting period occurs.

Therefore, in the first embodiment, a low-latency DBA scheme assuming a plurality of BBUs is provided.

(A-2) Configuration of First Embodiment

A case where, for example, the present invention is applied to a radio system which provides LTE service will be described below.

FIG. 1 is a configuration diagram illustrating an overall configuration of a communication system according to the first embodiment.

In FIG. 1, the communication system 100 according to the first embodiment includes an OLT 10 serving as a station side optical line terminating apparatus, a plurality of ONUs 20-1 to 20-$n$ ($n$ is an integer) serving as subscriber side optical line terminating apparatuses, a plurality of BBUs 30-1 to 30-$n$ serving as base band processing units, a plurality of RRHs 40-1 to 40-$n$ serving as remote radio transmitting/receiving units, a layer 2 switch (L2SW) 50, a UE 60 and an optical multiplexer/demultiplexer 71.

In the following description, when a configuration common among the ONUs 20-1 to 20-$n$ is described, ONUs will be expressed as an ONU 20. The same will also apply to description of the BBUs 30-1 to 30-$n$ and the RRH 40-1 to 40-$n$.

The BBU 30 performs management control of radio communication and signal processing. The BBU 30 is connected to a radio core network (radio core NW) serving as an upper network and an L2SW 50. The BBU 30 modulates a packet received from the radio core NW to an orthogonal frequency division multiplexing (OFDM) signal and transmits the OFDM signal to the OLT 10 via the L2SW 50. Further, the BBU 30 demodulates the OFDM signal from each RRH 40 to an IP packet and transmits the IP packet to the radio core NW from the OLT 10 via the L2SW 50.

The RRH 40 transmits/receives signals to/from the UE 60 using a radio link. Each RRH 40 is connected to the corresponding ONU 20. When each RRH 40 receives an OFDM signal from the UE 60 via an antenna unit which is not illustrated, each RRH 40 provides the OFDM signal to the corresponding ONU 20. Further, when each RRH 40 receives an OFDM signal from the corresponding ONU 20, each RRH 40 wirelessly transmits the OFDM signal to the corresponding UE 60.

The UE 60 is a radio terminal, and, for example, a smartphone, a tablet PC, a notebook PC having a radio communication function, a game console, or the like, can be applied. In this embodiment, while, for example, a case will be described as an example where the radio transmission scheme is LTE, the radio transmission scheme is not limited to LTE, and, may be, for example, WiFi (registered trademark), WiMAX (registered trademark), other radio transmission schemes of mobile phone radio communication, or the like.

The OLT 10 is connected to the optical line (optical fiber transmission path) 72, and performs optical communication with the ONU 20. The OLT 10 converts an optical signal received via the optical line 72 into an electrical signal and provides the electrical signal to the corresponding BBU 30 via the L2SW 50. Further, the OLT 10 converts an OFDM signal from the BBU 30 into an optical signal via the L2SW 50 and transmits the optical signal to the optical line 72.

The ONU 20 is connected to the optical line 72 and performs optical communication with the OLT 10. The ONU 20 converts the optical signal received via the optical line 72 into an electrical signal and provides the electrical signal to the corresponding RRH 40. Further, the ONU 20 converts an OFDM signal from the corresponding RRH 40 into an optical signal and transmits the optical signal to the optical line 72.

FIG. 1 illustrates a case where, for example, the TDM-PON system is applied to the MFH of a radio system (mobile access network).

Here, a configuration of a typical optical network communication system of the TDM-PON system will be described briefly, and communication in a direction from the plurality of ONUs 20-1 to 20-n to the OLT 10 (uplink communication) and communication in a direction from the OLT 10 to each of the plurality of ONUs 20-1 to 20-n (downlink communication) will be described.

The TDM-PON system is configured such that the OLT 10 and the plurality of ONUs 20-1 to 20-n are connected via a PON including the optical multiplexer/demultiplexer 71.

Concerning uplink signals from the ONUs 20-1 to 20-n to the OLT 10, signals respectively transmitted from the ONUs 20-1 to 20-n are multiplexed by the optical multiplexer/demultiplexer 71, and the multiplexed signals are transmitted toward the OLT 10. Therefore, when uplink signals are randomly transmitted from the respective ONUs, there is a possibility that the uplink signals collide on an optical transmission path. One of methods for avoiding this collision is a method called TDMA. With the TDMA, uplink signals are multiplexed while transmission timings from the respective ONUs are controlled.

Further, the OLT 10 provides signals obtained by converting the received uplink signals into electrical signals to the corresponding BBUs 30-1 to 30-n via the L2SW 50.

Downlink signals from the OLT 10 toward the ONUs 20-1 to 20-n, which are downlink signals from the OLT 10 multiplexed using the TDM method, are demultiplexed at the optical multiplexer/demultiplexer 71 and respectively transmitted to the ONUs 20-1 to 20-n. Therefore, the same downlink signals are transmitted to all the ONUs 20-1 to 20-n. Each ONU extracts only a signal addressed to the own unit and discards other signals.

FIG. 3 is a configuration diagram illustrating a main internal configuration of the OLT 10 and each BBU 30 according to the first embodiment.

As illustrated in FIG. 3, the OLT 10 mainly includes a DBA unit 11, an optical transmitting/receiving unit 12, and an OLT MAC (OLT media access processing) unit 13.

The optical transmitting/receiving unit 12 and the OLT MAC unit 13 are similar to those of the existing OLT. That is, the optical transmitting/receiving unit 12 performs physical layer processing (such as, for example, interconversion processing of an electrical signal and an optical signal) of the OLT of the PON system. The OLT MAC unit 13 performs media access layer processing (such as, for example, generation of a GATE frame, and reception and analysis of a REPORT frame) as the OLT of the PON system. Further, the OLT MAC unit 13 performs MAC layer processing according to an interface with the BBU 30.

The DBA unit 11 allocates a dynamic band to each ONU 20 according to a DBA algorithm and notifies the OLT MAC unit 13 of a DBA calculation result including the allocated band (ONU allocated bandwidth), a transmission timing (ONU band allocated time), or the like.

Here, a case where the DBA unit 11 performs low-latency DBA processing described in Non-Patent Literature 1 will be described.

That is, the DBA unit 11 monitors a schedule calculating unit 31 which calculates allocated band information of a radio band in each BBU 30, acquires a scheduling calculation result including an allocated band (UEs allocated band), a transmission timing (UEs transmission time), or the like, of each UE 60 from the schedule calculating unit 31, recognizes in advance time at which a signal arrives at the ONU 20 from each RRH 40, and obtains an allocated band (ONU allocated bandwidth), a transmission timing (ONU band allocated time), or the like, of each ONU 20 so as to match the arrival time.

As illustrated in FIG. 3, each BBU 30 mainly includes a schedule calculating unit 31 and a base band processing unit 32. Further, each BBU 30 can be connected to a BBU synchronization control unit 35.

The BBU synchronization control unit 35 transmits a synchronization control signal for achieving synchronization among the BBUs 30 to the base band processing unit 32 of each BBU 30. It should be noted that because the BBU synchronization control unit 35 only has to be connectable with each BBU 30, for example, the BBU synchronization control unit 35 may be provided within the same apparatus as an apparatus in which each BBU 30 is mounted, may be provided within an apparatus in which the OLT 10 is mounted or may be provided within an apparatus different from these apparatuses.

The schedule calculating unit 31 acquires information of each UE including a requested band (UEs requested band), radio environment information (UEs radio environment), or the like of each UE 60, from the base band processing unit 32, and calculates a band in the radio system based on such information of each UE.

The schedule calculating unit 31 performs processing of scheduling an allocated band of a radio band (UEs allocated band), a transmission timing (UEs transmission time), or the like of each UE, in a schedule cycle of the radio system as with the schedule calculating unit of the existing BBU. For example, the schedule cycle of LTE is 0.5 ms. Therefore, the schedule calculating unit 31 calculates an allocated band or transmission time of each ONU in this schedule cycle period while setting a schedule cycle of 0.5 ms of the LTE as one cycle. The schedule calculating unit 31 notifies the base band processing unit 32 and the DBA unit 11 in the OLT 10, of the schedule calculation result.

The base band processing unit 32 performs base band processing (such as, for example, digital/analog interconversion processing, modulation/demodulation processing and radio band signal processing) on a signal from the radio core NW and a signal from the L2SW 50.

The base band processing unit 32 notifies the schedule calculating unit 31 of a requested band of each UE 60 and radio environment information as with the existing base band processing unit. Further, the base band processing unit 32 receives a synchronization control signal from the BBU synchronization control unit 35 and adjusts start time of scheduling calculation according to the synchronization control signal.

(A-3) Operation of First Embodiment

Operation of synchronization control processing among the BBUs 30 according to the first embodiment will be described in detail next with reference to the drawings.

First, synchronization control by the BBU synchronization control unit 35 is performed upon initial activation of the system. That is, upon initial activation of the system, the BBU synchronization control unit 35 transmits a synchronization control signal of a predetermined cycle to each of the base band processing units 32 of the BBUs 30-1 to 30-n. By the synchronization control signal of the predetermined cycle transmitted to each of the BBUs 30-1 to 30-n in this manner, it is possible to achieve synchronization among the BBUs 30-1 to 30-n.

It should be noted that transmission of the synchronization control signal is not limited to timing of initial activation of the system, and, may be performed when it is necessary to achieve synchronization among the BBUs 30, for example, when the BBUs are out of synchronization, or when a system operation state is changed.

Here, the BBU synchronization control unit 35 transmits a synchronization control signal to each of the BBUs 30-1 to 30-n for each schedule cycle period of the radio system (for example, a slot cycle of the LTE).

For example, as illustrated in FIG. 4, the BBU synchronization control unit 35 transmits a synchronization control signal to the BBU 30-1 for each schedule cycle period. Further, the synchronization control unit 35 transmits a synchronization control signal to the BBU 30-2 after predetermined duration AT has elapsed since the synchronization control signal is transmitted to the BBU 30-1. It should be noted that the synchronization control unit 35 transmits a synchronization control signal to the BBU 30-2 for each schedule cycle period as with the BBU 30-1.

Further, the synchronization signal interval At is duration corresponding to a maximum band of a radio frame so that even when the maximum band is used in the radio frame, allocated bands of the ONUs 20 do not collide with each other.

Subsequently, when the radio system is started, as with the existing radio band allocation operation, each of the BBUs 30-1 to 30-n performs allocation of a radio band of each of the UEs 60 and schedule processing of a transmission timing (transmission time).

That is, the base band processing unit 32 notifies the schedule calculating unit 31 of the requested band of the UE 60 and the radio environment information. In response to the notification, the schedule calculating unit 31 performs allocation of a radio band of the UE 60 and scheduling including transmission time. Then, the base band processing unit 32 and the DBA unit 11 in the OLT 10 are notified of the schedule calculation result obtained by the schedule calculating unit 13.

Subsequently, at the OLT 10, the DBA unit 11 obtains in advance an allocated band (ONU allocated bandwidth), a transmission timing (ONU band allocated time) or the like of each ONU 20, so as to match the time at which a signal arrives at each ONU 20 from each RRH 40 based on the radio band and the transmission time of each UE in the radio system as with the dynamic band allocation processing described in Non-Patent Literature 1.

FIG. 4 is a timing chart illustrating communication processing in the communication system 100 according to the first embodiment.

Each of the BBUs 30-1 to 30-n instructs each UE 60 to transmit a radio frame according to the synchronization control signal from the BBU synchronization control unit 35. By this means, the radio frame arrives at each ONU 20 from each RRH 40 according to this synchronization control signal.

As illustrated in FIG. 4A to FIG. 4C, the BBUs 30-1 to 30-n are synchronized according to the synchronization control signal from the BBU synchronization control unit 35.

For example, when the BBU 30-1 receives a radio frame from the RRH 40-1, the BBU 30-1 instructs the UE 60 to perform transmission according to the synchronization control signal. Therefore, the RRH 40-1 which receives an OFDM signal from the UE 60 transmits the OFDM signal within a cycle period of the synchronization control signal of the BBU 30-1 (see FIG. 4D).

As illustrated in FIG. 4E, the ONU 20-1 transmits a radio frame to the OLT 10 according to an allocation grant allocated by the DBA unit 11 in the OLT 10.

Further, in a similar manner, the RRH 40-2 transmits the OFDM signal received from the UE 60 to the ONU 20-2 according to the synchronization control signal of the BBU 30-2 (see FIG. 4F). The ONU 20-2 transmits the radio frame to the OLT 10 according to the allocation grant allocated by the DBA unit 11 in the OLT 10 (FIG. 4G).

As described above, by the OLT 10 allocating a dynamic band to each ONU 20, as illustrated in FIG. 4E and FIG. 4G, it is possible to prevent allocation grants from being overlapped between the ONU 20-1 and the ONU 20-2.

(A-4) Effects of First Embodiment

As described above, according to the first embodiment, because BBUs can operate in synchronization with each other in a state where the system is configured with a plurality of BBUs, allocation grants do not collide upon TDMA. Further, because an allocation grant is allocated to the ONU in synchronization with a radio data arrival timing, it is possible to suppress occurrence of transmission latency.

(B) Second Embodiment

A second embodiment of the band control system, the band control apparatus and the communication apparatus according to the present invention will be described in detail next with reference to the drawings.

(B-1) Configuration of Second Embodiment

Figure 5:
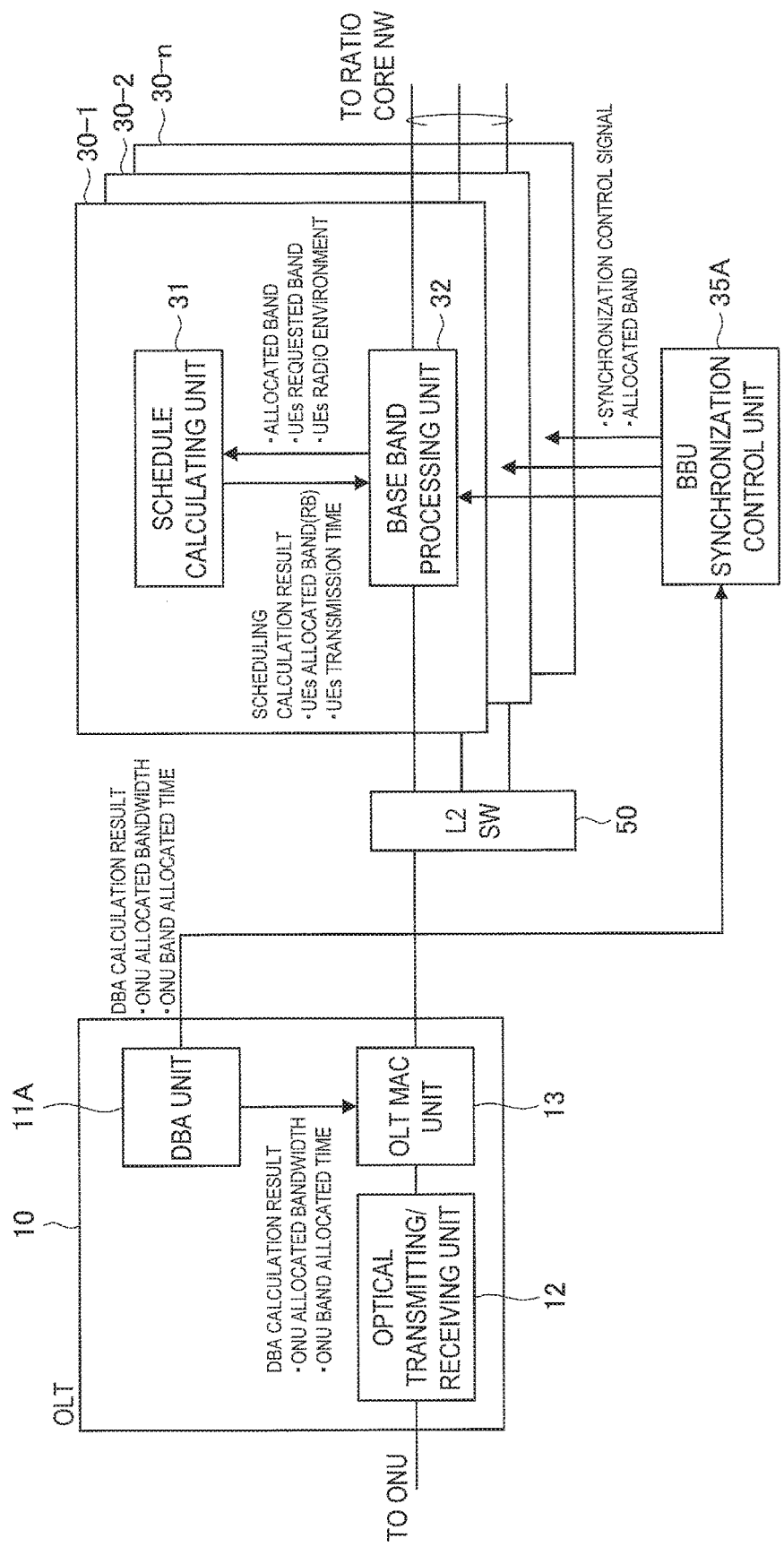
FIG. 5 is a configuration diagram illustrating a main internal configuration of an OLT and each BBU according to the second embodiment.

FIG. 5 is a configuration diagram illustrating a main internal configuration of the OLT 10 and each BBU 30 according to the second embodiment.

In the following description, structural elements different from those in the first embodiment will be mainly described, and detailed description of other structural elements will be omitted because other structural elements are similar to those in FIG. 3 of the first embodiment.

In the first embodiment, a case has been described where the DBA unit 11 is the DBA unit described in Non-Patent Literature 1. Meanwhile, in the second embodiment, a DBA unit 11A performs existing DBA processing.

The DBA unit 11A dynamically allocates a band to each ONU 20 according to an amount of waiting uplink data (such as a data amount) of each ONU 20 provided by the OLT MAC unit 13 according to the DBA algorithm, and notifies the OLT MAC unit 13 and a BBU synchronization control unit 35A of a DBA calculation result such as the allocated band (ONU allocated bandwidth) and a transmission timing (ONU band allocated time) basically as with the existing DBA unit.

The BBU synchronization control unit 35A notifies the base band processing unit 32 of each BBU 30 of a synchronization control signal and allocated band information based on the DBA calculation result from the DBA unit 11A.

That is, the BBU synchronization control unit 35A transmits the synchronization control signal to the corresponding BBU 30 according to the timing of the allocation grant of each ONU 20 allocated by the DBA unit 11A.

(B-2) Operation of Second Embodiment

Figure 6:
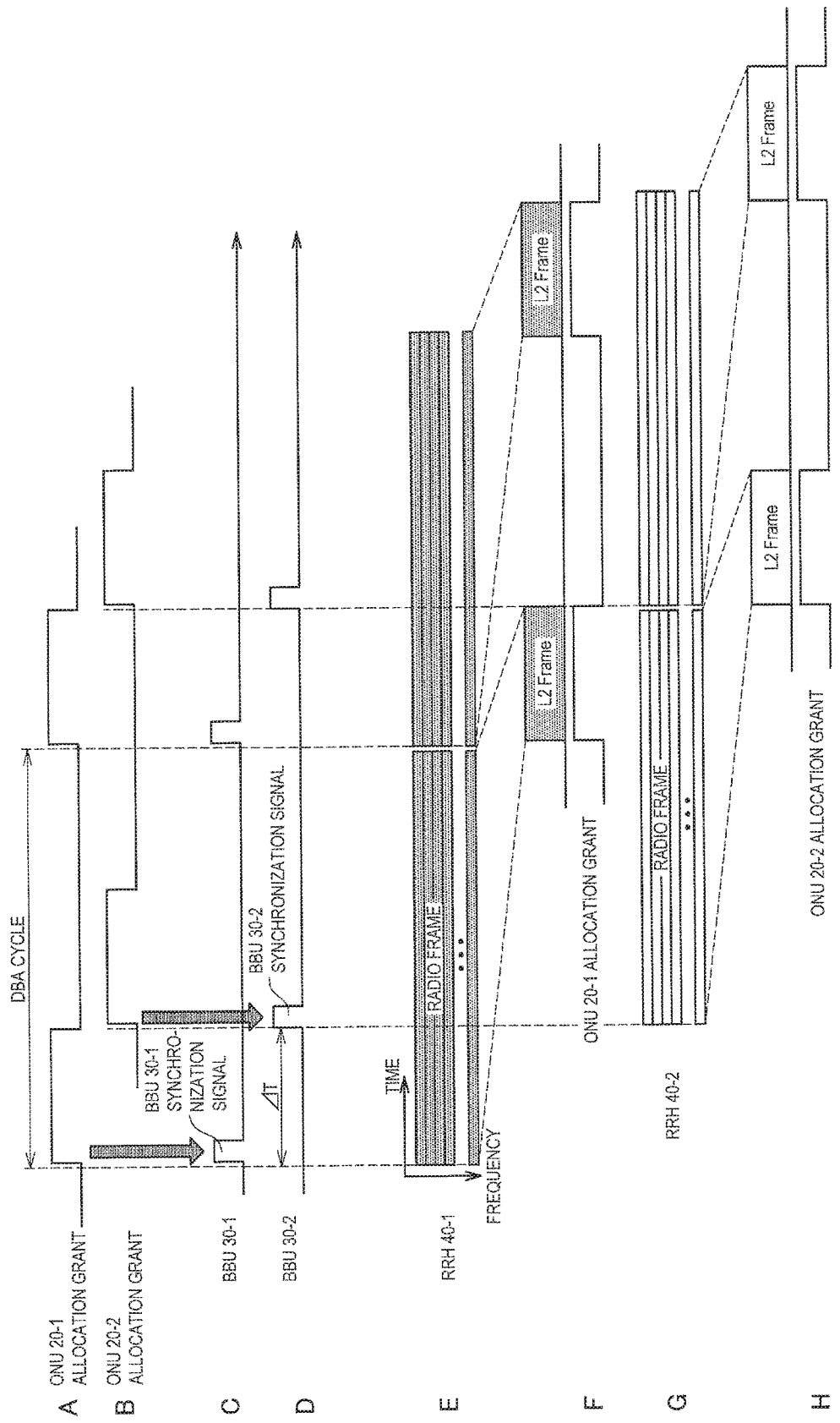
FIG. 6 is a timing chart illustrating communication processing in a communication system according to the second embodiment.

FIG. 6 is a timing chart illustrating communication processing in the communication system 100 according to the second embodiment.

The DBA unit 11A in the OLT 10 dynamically allocates bands to the ONUs 20-1 and 20-2 according to the amount of waiting uplink data of the ONUs 20-1 and 20-2 provided by the OLT MAC unit 13 according to the DBA algorithm and obtains a DBA calculation result such as the allocated band (ONU allocated bandwidth) and a transmission timing (ONU band allocated time).

The DBA unit 11A notifies the OLT MAC unit 13 and the BBU synchronization control unit 35A of the calculated DBA calculation result. That is, the DBA unit 11A notifies the BBU synchronization control unit 35A of the allocation grants allocated to the ONUs 20-1 and 20-2 in the DBA cycle (see FIG. 6A and FIG. 6B).

The BBU synchronization control unit 35A transmits the synchronization control signal to the corresponding BBU 30 according to timings of the allocation grants of the ONU 20-1 and 20-2 allocated by the DBA unit 11A (FIG. 6C and FIG. 6D). At this time, the duration ΔT between the BBU 30-1 and the BBU 30-2 becomes duration according to a requested band amount of the ONU 20-1 calculated by the DBA unit 11A.

Each of the BBUs 30-1 and 30-2 instructs each UE 60 to transmit a radio frame according to the synchronization control signal from the BBU synchronization control unit 35 as with the first embodiment. By this means, the radio frame arrives at each of the ONUs 20-1 and 20-2 from each RRH 40 according to this synchronization control signal.

Therefore, the RRH 40-1 which has received an OFDM signal from the UE 60 transmits the OFDM signal within a cycle period of the synchronization control signal of the BBU 30-1 (see FIG. 6E).

As illustrated in FIG. 6F, the ONU 20-1 transmits a radio frame to the OLT 10 according to the allocation grant allocated by the DBA unit 11 in the OLT 10.

Further, in a similar manner, the RRH 40-2 transmits the OFDM signal received from the UE 60 to the ONUT 20-2 according to the synchronization control signal of the BBU 30-2 (see FIG. 6G). The ONU 20-2 transmits the radio frame to the OLT 10 according to the allocation grant allocated by the DBA unit 11 in the OLT 10 (FIG. 6H).

As described above, by the OLT 10 allocating a dynamic band to each ONU 20, as illustrated in FIG. 6F and FIG. 6H, it is possible to avoid overlapping of the allocation grants between the ONU 20-1 and the ONU 20-2.

(B-3) Effects of Second Embodiment

As described above, according to the second embodiment, in addition to the effects similar to those of the first embodiment, it is possible to achieve synchronization among the BBUs at a timing obtained by the existing DBA calculation result because the DBA unit does not have to refer to the scheduling calculation result.

(C) Third Embodiment

A third embodiment of the band control system, the band control apparatus and the communication apparatus according to the present invention will be described in detail next with reference to the drawings.

(C-1) Gist of Third Embodiment

Figure 7:
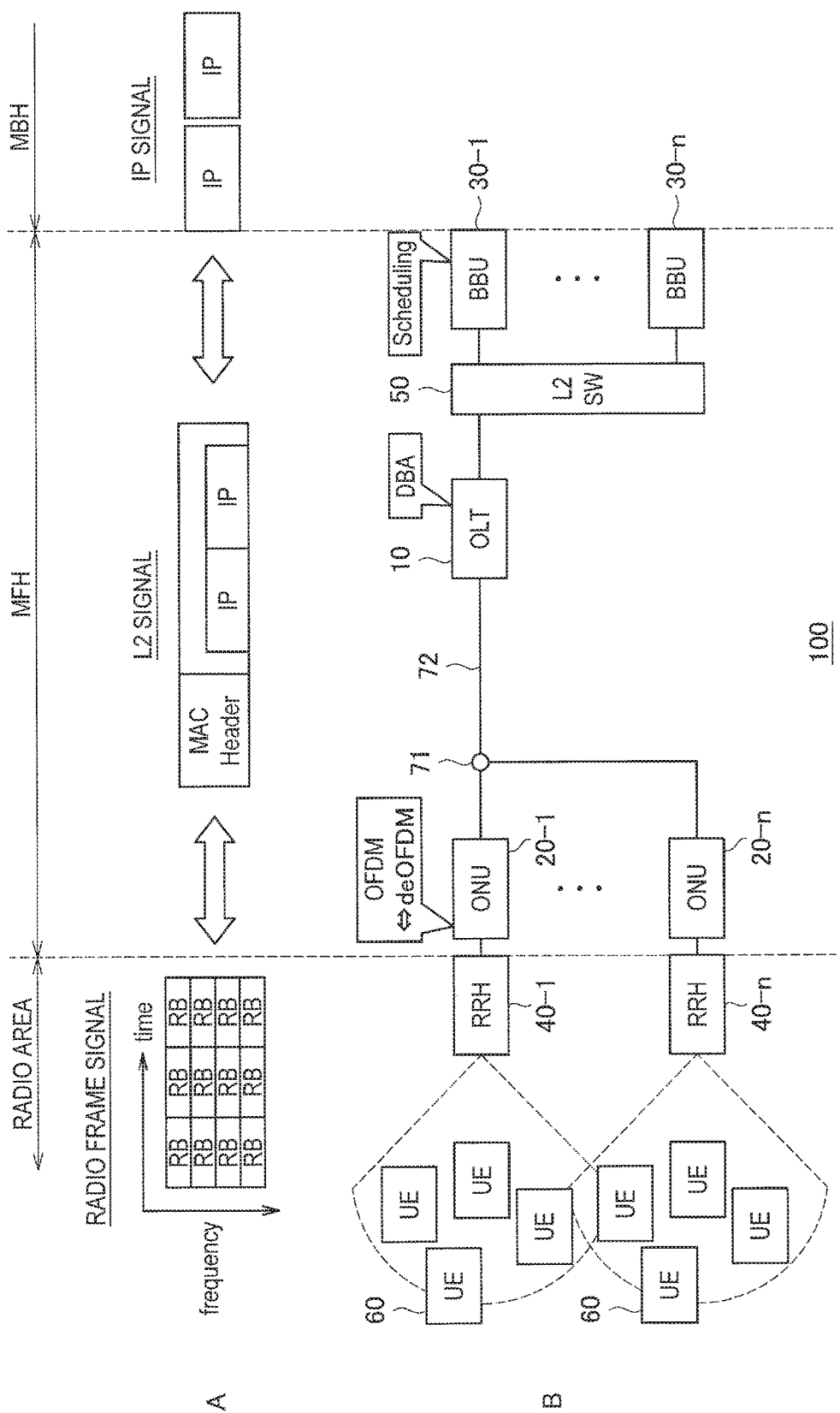
FIG. 7 is a configuration diagram illustrating a configuration of a communication system in which a TDM-PON system is applied to an MFH of a radio system.

FIG. 7 is a configuration diagram illustrating a configuration of the communication system in which the TDM-PON system is applied to the MFH of the radio system.

While, in related art, the BBU accommodates radio frames; in the present embodiment, the ONU or the RRH accommodates radio frames. By this means, it is possible to suppress increase of a band of a common public radio interface (CPRI), or the like, through data transmission after AD conversion, so that it is possible to increase the number of time division multiplexed channels in the PON section (OLT-ONU). In the PON section, a frame of a layer 2 (L2) is handled.

Figure 8:
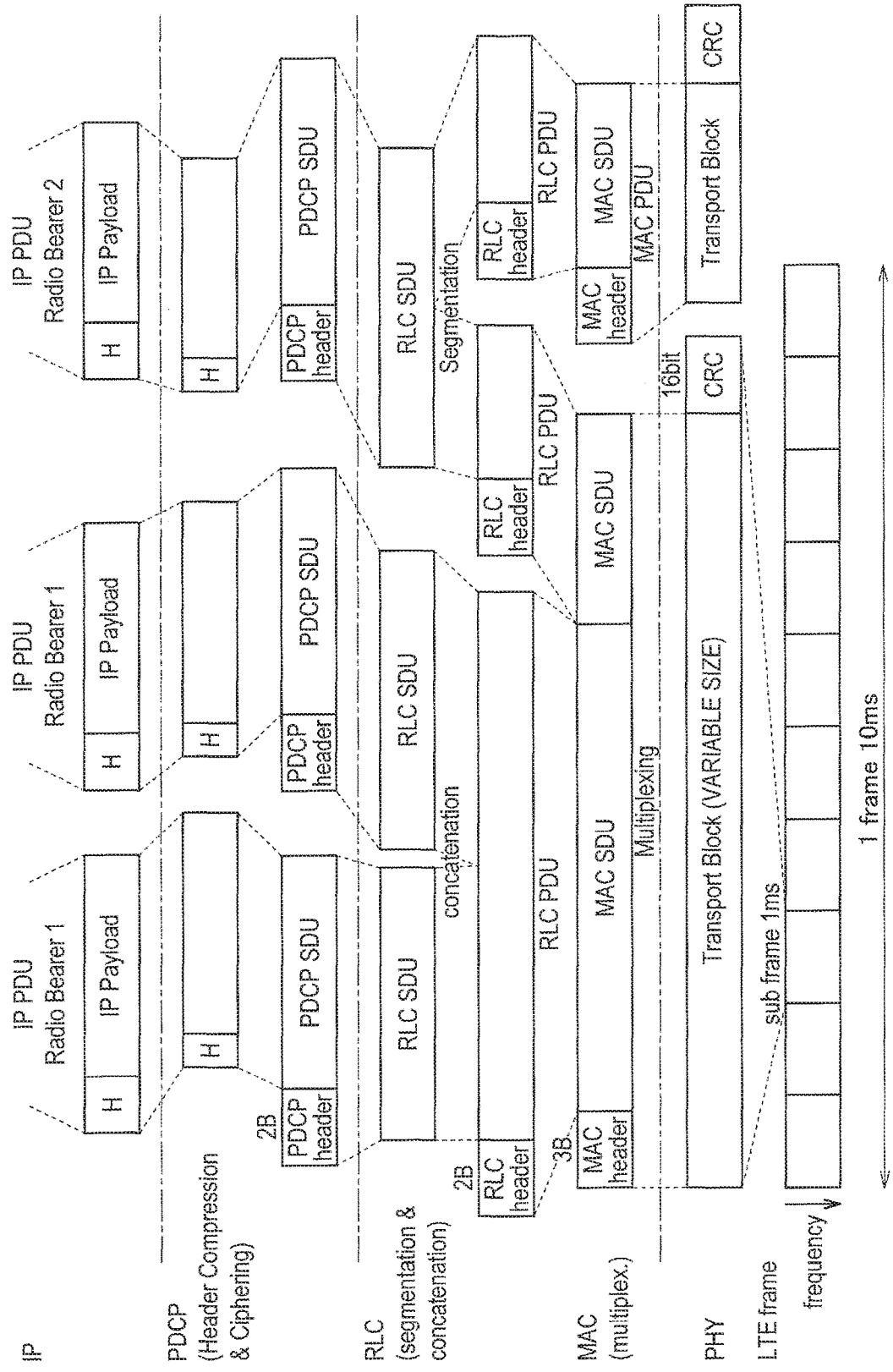
FIG. 8 is a configuration diagram illustrating a L2 frame configuration of an IP packet in LTE service.

FIG. 8 is a configuration diagram illustrating an L2 frame configuration of an IP packet in the LTE service.

As illustrated in FIG. 8, IP packets are collected for each address and finally stored in a transport block (TB). The TB size is a variable length, and is determined according to an RB allocated through scheduling or a multi-value. This TB is stored in a radio subframe (configured with a time axis and a frequency axis). In the stipulation of the LTE, a length of one frame is 10 ms, and one frame is divided into 10 subframes of 1 ms.

Figure 9:
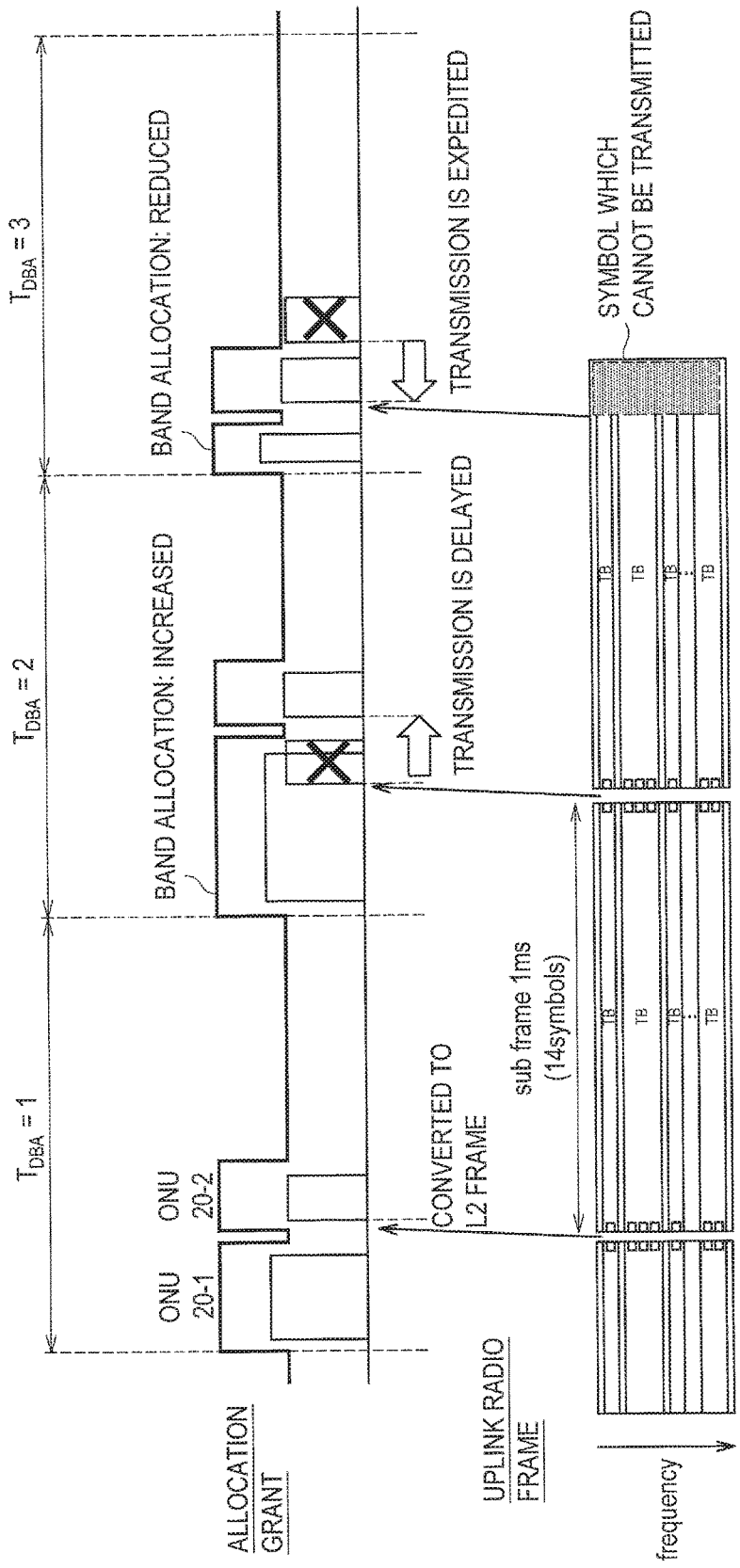
FIG. 9 is an explanatory diagram explaining problems to be solved by a band control system according to a third embodiment.

FIG. 9 is an explanatory diagram explaining problems to be solved by the band control system according to the third embodiment.

A DBA cycle length in FIG. 9 is, for example, 1 ms which is the same as the radio subframe length, and a TB accommodated in the radio subframe is converted into an L2 frame and transmitted for each DBA cycle.

The first problem is that, when the allocation grant of the ONU 10 increases compared to the previous DBA cycle, the allocation grant of the ONU 20 is postponed and a period for waiting transmission of the L2 frame which occurs in a subframe cycle occurs (FIG. 9, $T_{DBA}=2$). In this case, transmission time of the ONU 2 is delayed by an amount corresponding to the increase of the allocation grant of the ONU 1. This delay causes uplink data transmitted for each 1 [ms] to be transmitted at 1+ΔT [ms], which appears to be transmission jitter on the reception side. This component is required to be suppressed to equal to or less than a delay period (<several hundred μs) required at the MFH of the radio system.

The second problem is that, when the allocation grant of the ONU 10 is reduced compared to the previous DBA cycle, the allocation grant of the ONU 20 is started before the whole subframe is received (FIG. 9, $T_{DBA}=3$). If split transmission of the TB is made impossible, a symbol which cannot be transmitted occurs among a subframe (stipulated in the LTE) configured with 14 symbols.

Because the effects of the above-described two problems proportionally increase in order of TDMA, the ONU which performs transmission last is most affected.

Therefore, the third embodiment solves the above-described problems.

(C-2) Configuration of Third Embodiment

Figure 10:
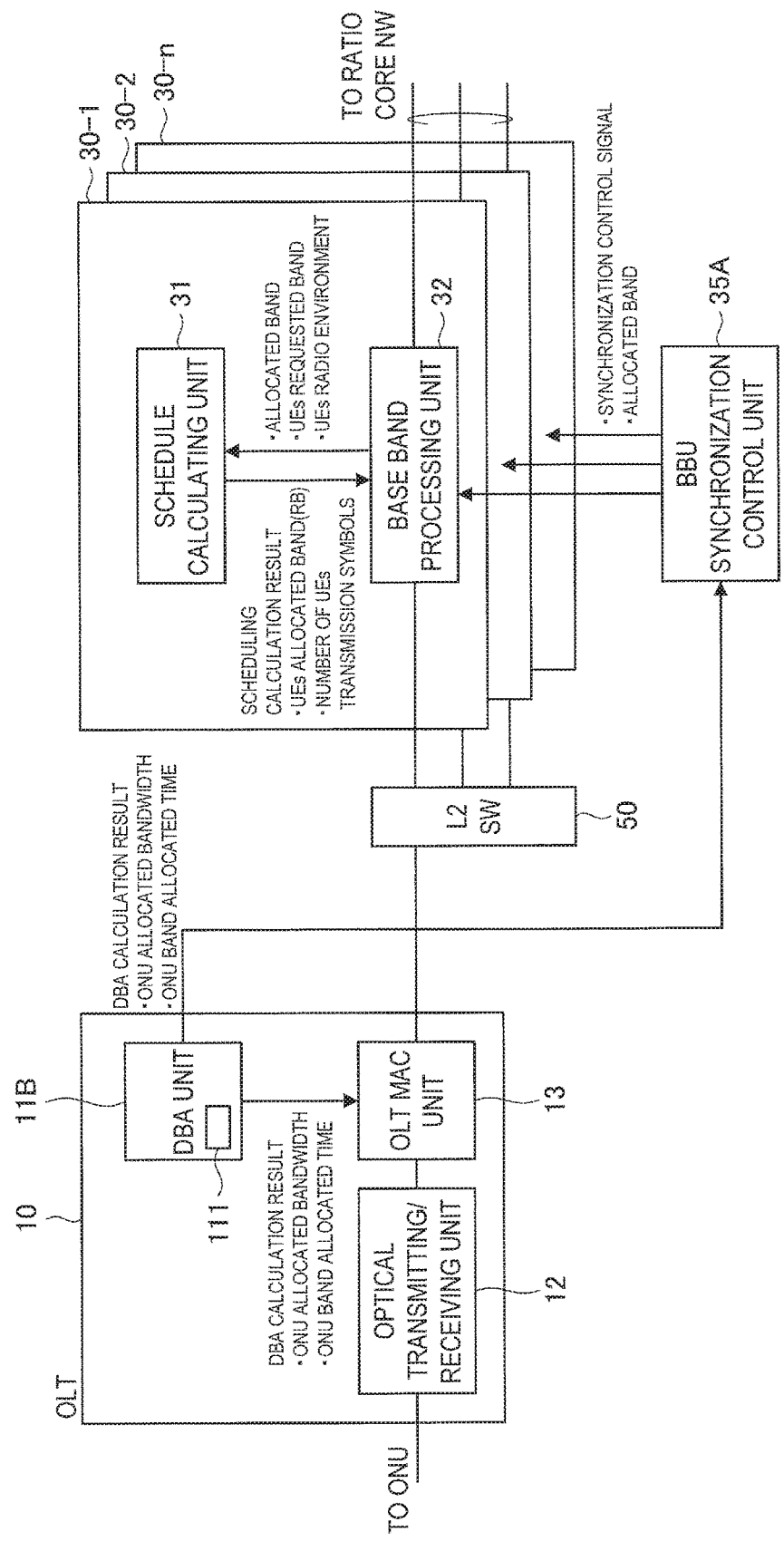
FIG. 10 is a configuration diagram illustrating a main internal configuration of an OLT and each BBU according to the third embodiment.

FIG. 10 is a configuration diagram illustrating a main internal configuration of the OLT 10 and each BBU 30 according to the third embodiment.

In the following description, structural elements different from those in the first and the second embodiments will be mainly described, and detailed description of other structural elements will be omitted because other structural elements are similar to those in the first and the second embodiments.

As with the second embodiment, a DBA unit 11B dynamically allocates a band to each ONU 20 according to an amount of waiting uplink data (such as a data amount) of each ONU 20 provided by the OLT MAC unit 13 according to the DBA algorithm and notifies the OLT MAC unit 13 and the BBU synchronization control unit 35A of a DBA calculation result such as the allocated band (ONU allocated bandwidth) and a transmission timing (ONU band allocated time).

Further, the DBA unit 11B includes a grouping unit 111.

Figure 11:
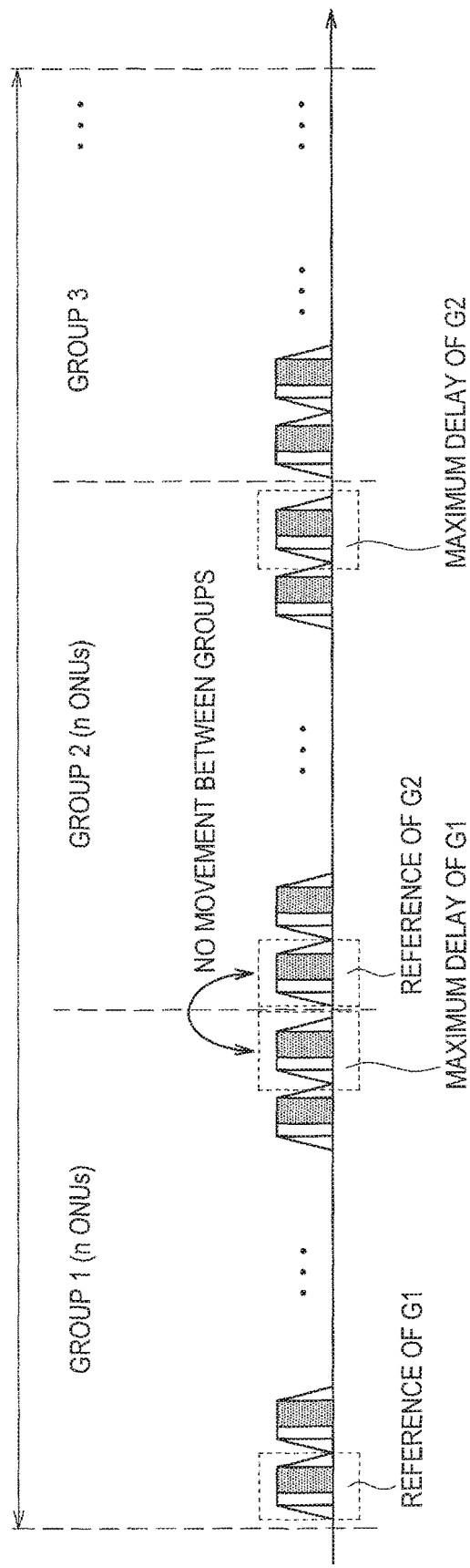
FIG. 11 is an explanatory diagram explaining group division processing of a DBA cycle according to the third embodiment.

As illustrated in FIG. 11, the grouping unit 111 divides the DBA cycle into a plurality of groups sectioned by a predetermined period, so that each group accommodates a predetermined number of ONUs 20. Further, the grouping unit 111 does not move the ONUs 20 between the groups. That is, once the predetermined number of the ONUs 20 are set for each group, the ONUs 20 are not changed to other groups. By this means, it is possible to limit, to a group length, the transmission waiting period and the number of symbols which cannot be transmitted, which, in related art, proportionally increase in order of TDMA and which, in related art, are generated up to a DBA cycle length. Further, it is possible to equalize the transmission waiting period and the number of symbols which cannot be transmitted of each group.

The BBU synchronization control unit 35A notifies the base band processing unit 32 in each BBU 30 of the synchronization control signal and the allocated band information based on the DBA calculation result from the DBA unit 11A as with the first embodiment.

(C-3) Operation of Third Embodiment

Operation of dynamic band allocation processing in the communication system 100 according to the third embodiment will be described next with reference to the drawings.

In the DBA unit 11B of the OLT 10, the grouping unit 111 divides the DBA cycle into a plurality of groups sectioned by a predetermined period, so that each group accommodates a predetermined number of ONUs 20.

Because service quality (transmission waiting period and the number of symbols which cannot be transmitted) of each group is the same, in group division processing, it is only necessary to simply sort the ONUs in order of ONUs 20-1 to 20-n so that the number of ONUs accommodated in each group becomes the same.

Further, the group division processing by the grouping unit 111 is performed once at a time of starting the service. Then, even when an ONU 20 newly joins, the new ONU 20 is added to a vacant group so that the number of accommodated ONUs becomes the same in a similar manner.

The result of the group division is reflected at setting time of the allocation grant as a bias period. For example, as illustrated in FIG. 11, the setting time of the allocation grant is set such that a bias period of a group 1=0 µs, a bias period of a group 2=200 µs, a bias period of a group 3=400 µs, . This bias period becomes a reference of allocation grant start time of each group. Further, because DBA calculation by the DBA unit 11B can be performed through existing DBA processing as with the second embodiment, detailed description of the DBA calculation will be omitted here.

Further, the BBU synchronization control unit 35A is notified of the DBA calculation result from the DBA unit 11B. Further, the BBU synchronization control unit 35A notifies the base band processing unit 32 in each of the BBUs 30-1 to 30-n of the synchronization control signal and the DBA calculation result.

At each of the BBUs 30-1 to 30-n, the base band processing unit 32 notifies the schedule calculating unit 31 of the DBA calculation result, a UEs requested band, and UEs radio environment.

The schedule calculating unit 31 calculates the number of transmission symbols and an allocated band of each UE 60 of a radio band based on the DBA calculation result, the UEs requested band and the UEs radio environment information from the base band processing unit 32.

Figure 12:
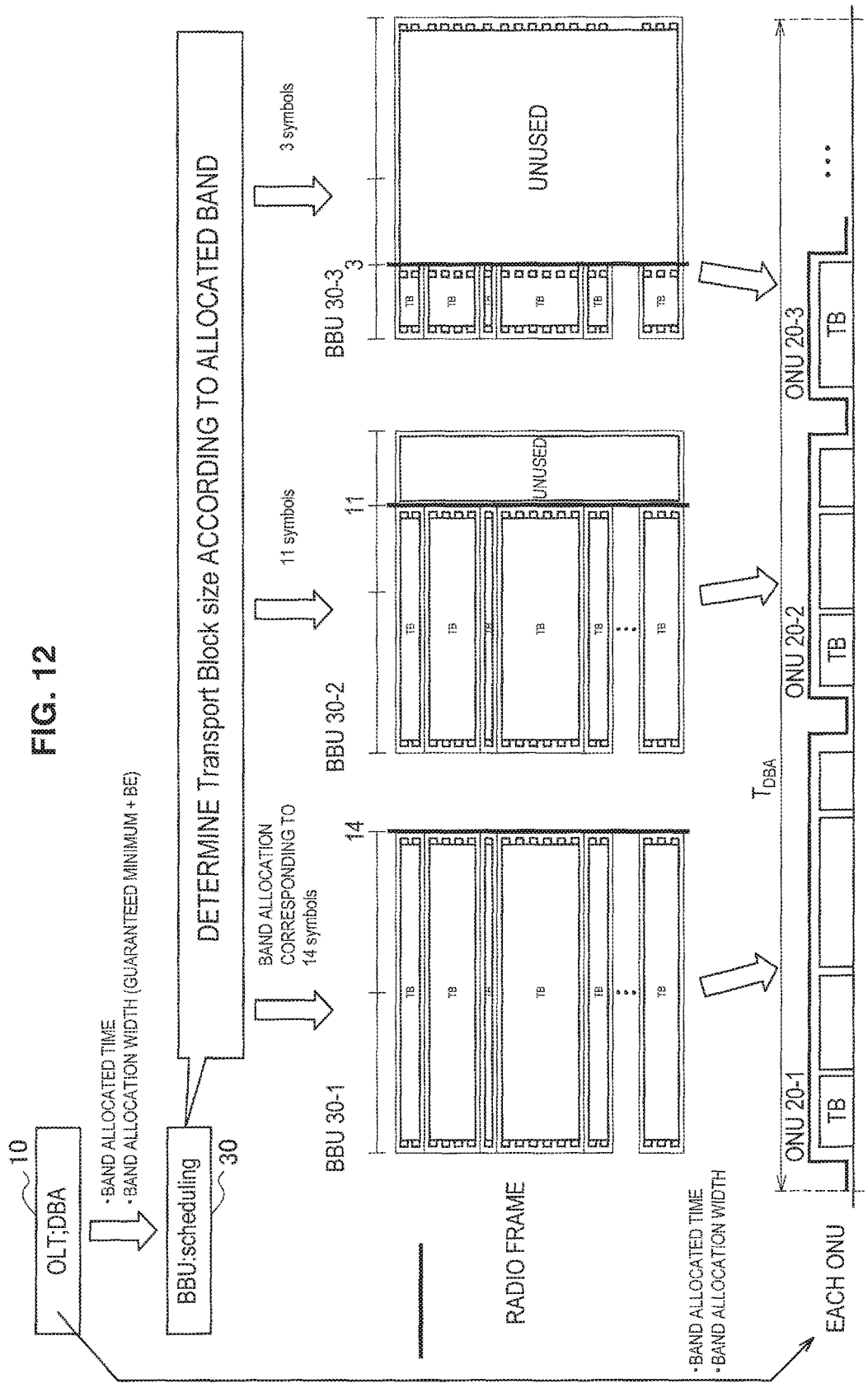
FIG. 12 is an explanatory diagram explaining dynamic band allocation processing according to the third embodiment.

FIG. 12 is an explanatory diagram explaining dynamic band allocation processing according to the third embodiment.

FIG. 12 illustrates operation of processing of determining a transport block (see FIG. 8) size based on the DBA calculation result.

The schedule calculating unit 31 of each BBU 30 is notified of duration of the allocation grant which is an allocation band (ONU allocated band) allocated to each of the ONUs 20-1 to 20-n and transmission time (that is, including the above-described bias period) information for each DBA cycle. Based on this duration of the allocation grant, the transport block size is determined, and scheduling of each BBU is controlled to be synchronized based on the time of the allocation grant.

Through these processing, the number of symbols used in the radio uplink frame and an occurrence timing are adjusted, so that the L2 frame can arrive so as to match the transmission time and the duration of the allocation grant of the ONU 20.

Through the above-described operation, it is possible to limit the transmission waiting period and the number of symbols which cannot be transmitted that occur due to dynamic increase/reduction of the allocation grant, to equal to or less than a predetermined amount.

(C-4) Verification Result of Third Embodiment

Figure 13:
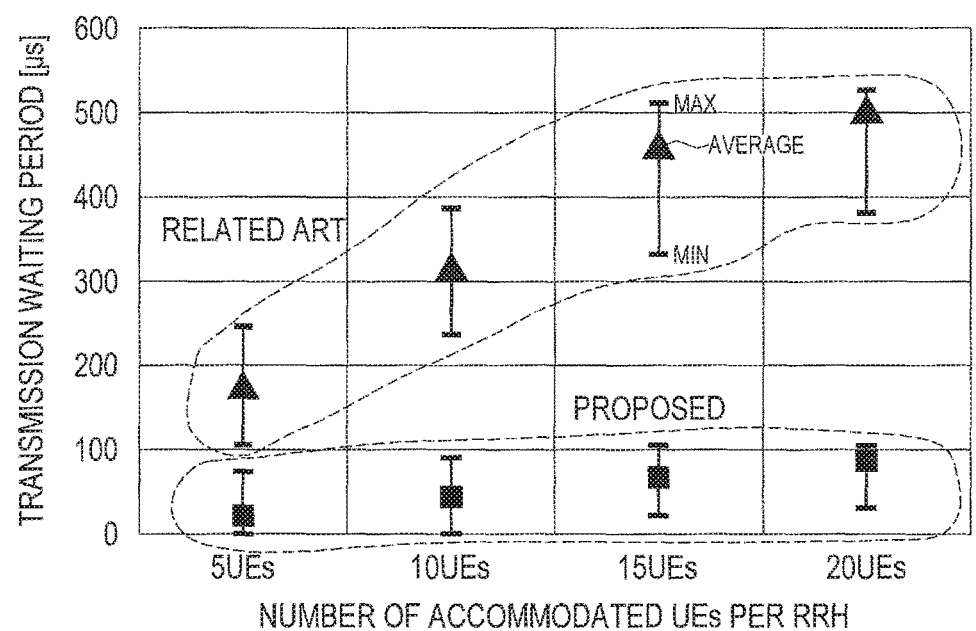
FIG. 13 is a diagram illustrating a simulation result of a transmission waiting period as verification of an effect of a low-latency DBA scheme of the third embodiment.

FIG. 13 is a diagram illustrating a simulation result of the transmission waiting period as verification of the effect of the low-latency DBA scheme of the third embodiment.

In the calculation of the third embodiment, a transmission waiting period of the ONU which is subjected to TDMA last in the group is calculated. Further, in the scheme in related art as a comparative example, transmission waiting periods of all the ONUs are calculated.

The horizontal axis in FIG. 13 indicates the number of UEs connected to one RRH. Traffic of each UE is expressed with exponential distribution using an FTP model.

The length of one group is set at 105 µs so as to satisfy a delay request (<several hundred µs) of the MFH. The number of symbols which cannot be transmitted for this value is a minimum of one symbol. A transmission delay period of the last ONU is calculated. It can be seen from the graph that the transmission waiting period increases in accordance with increase of the number of connected UEs. This is because as a result of increase of the number of UEs, a stochastically occurring requested traffic amount increases, and the L2 frame size becomes larger. While, in the scheme in related art, a waiting period of equal to or longer than 500 μs occurs; with the proposed scheme, the waiting period can be limited to equal to or less than 105 μs which is the set group length.

(C-5) Effects of Third Embodiment

As described above, according to the third embodiment, in addition to the effects of the first and the second embodiments, it is possible to limit the transmission waiting period and the number of symbols which cannot be transmitted that occur due to dynamic increase/reduction of the allocation grant, to equal to or less than a predetermined amount.

(D) Other Embodiments

While modified embodiments of the present invention have been referred to in the above-described embodiments, the present invention can be applied to the following modified embodiments.

While a case where the PON system includes the ONU 20 and the OLT 13 has been described as an example of the above-described communication system 100, the present invention is not limited to this example, and the communication system 100 may be a communication system other than the PON system. That is, the communication system 100 may include a communication terminal other than the ONU 20 and the OLT 13 and a managing apparatus which manages the communication terminal.

Further, the BBU 30 may include a circuit such as, for example, a CPU and an FPGA, and the BBU 30 may read a program from an apparatus such as a memory and an HDD and execute the program.

In the above-described embodiment, a case has been described where the TDM-PON system is applied to the MFH of the radio system. However, the PON system applied to the MFH can be also applied to a WDM/TDM-PON system.

Figure 14:
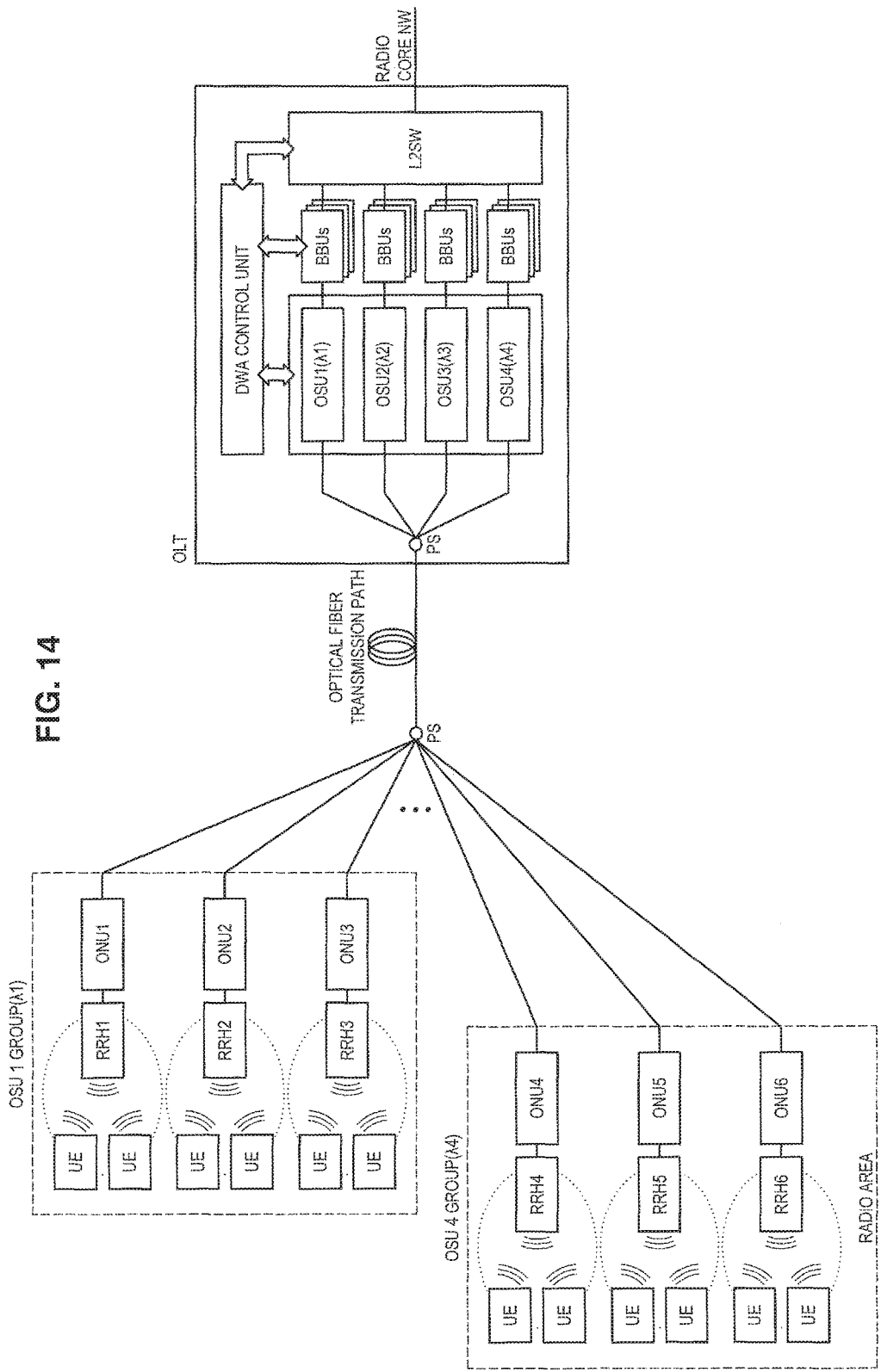
FIG. 14 is a configuration diagram illustrating a configuration of a communication system when a WDM/TDM-PON is applied to an MFH of a radio system.

FIG. 14 is a configuration diagram illustrating a configuration of the communication system in the case where the WDM/TDM-PON system is applied to the MFH of the radio system. Also in the case of the communication system illustrated in FIG. 14, because operation is performed while ONUs are divided into wavelength groups, the processing described in the first to the third embodiments can be applied.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A band control system which controls a communication band between a plurality of radio transmitting/receiving units configured to transmit/receive radio signals and a plurality of radio control units, the band control system comprising:
 a band allocation control unit; and
 a synchronization control unit,
 wherein communication between one or more optical communication terminals connected to the radio transmitting/receiving units and an optical communication managing apparatus configured to manage the one or more optical communication terminals is optical communication,
 wherein the radio transmitting/receiving units each perform radio communication with one or more radio terminals, and the radio control units are each associated with the one or more radio transmitting/receiving units,
 wherein the radio control units each include a radio communication timing calculating unit configured to calculate a timing at which the one or more radio transmitting/receiving units perform radio communication,
 wherein the band allocation control unit obtains optical communication bands according to the timings of the radio communication and allocates the optical communication bands to the one or more optical communication terminals corresponding to the one or more radio transmitting/receiving units, and
 wherein the synchronization control unit performs control in a manner that processing of the plurality of radio control units is synchronized with each other.

2. The band control system according to claim 1,
 wherein the radio control units each instruct the one or more radio terminals corresponding to each of the radio control units to perform transmission according to a synchronization control signal from the synchronization control unit.

3. The band control system according to claim 1,
 wherein the synchronization control unit sequentially transmits a synchronization control signal to different radio control units among the plurality of radio control units at a predetermined time interval required when a radio frame transmitted from the radio terminals are maximum bands.

4. The band control system according to claim 1,
 wherein the band allocation control unit allocates the optical communication bands in a manner that a radio frame arrives at the one or more optical communication terminals from the one or more radio transmitting/receiving units at the timings of the radio communication.

5. The band control system according to claim 1,
 wherein the radio communication timing calculating unit obtains the timing of the radio communication according to an amount of data to be acquired by the optical communication managing apparatus from the one or more optical communication terminals.

6. The band control system according to claim 1, further comprising:
 a grouping unit configured to divide the plurality of optical communication terminals into a plurality of groups,
 wherein the band allocation control unit divides one cycle of the optical communication bands into a plurality of cycles, and
 the grouping unit associates the optical communication terminals with one of the groups, while the number of associated optical communication terminals corresponds to the number of divided cycles.

7. The band control system according to claim 6,
 wherein the cycle of the optical communication bands is a dynamic bandwidth allocation (DBA) cycle.

8. A band control system which controls a communication band between a plurality of remote radio transceivers configured to transmit/receive radio signals and a plurality of base band units, the band control system comprising:

a band allocation control unit; and a synchronization control unit, wherein communication between one or more optical network units (ONUs) connected to the remote radio transceivers and an optical line terminal (OLT) is optical communication, wherein the remote radio transceivers each perform radio communication with one or more radio terminals, and the base band units are each associated with the one or more remote radio transceivers, wherein the base band units each include a radio communication timing calculation circuit configured to calculate a timing at which the one or more remote radio transceivers perform radio communication, wherein the band allocation control unit calculates optical communication bands to be obtained according to the timings of the radio communication and allocates the optical communication bands to the one or more ONUs corresponding to the one or more remote radio transceivers, and wherein the synchronization control unit performs control in a manner that processing of the plurality of base band units is synchronized with each other.

9. A band control system which controls a communication band between a plurality of radio transmitting/receiving units connected to one or more radio terminals and a plurality of radio control units corresponding to the plurality of radio transmitting/receiving units, the band control system comprising:

a band allocation control unit; and a synchronization control unit, wherein the radio control units each include a radio communication timing calculating unit configured to calculate a timing at which the one or more radio terminals perform radio communication, wherein the band allocation control unit obtains optical communication bands according to the timings of the radio communication calculated by the radio communication timing calculating units and allocates the optical communication bands to a plurality of slave station apparatuses corresponding to the radio transmitting/receiving units, and wherein the synchronization control unit performs control in a manner that synchronization is achieved among the plurality of radio control units.

10. The band control system according to claim 9, wherein the plurality of radio control units each instruct the one or more radio terminals corresponding to each of the radio control units to perform transmission according to a synchronization signal from the synchronization control unit.

11. The band control system according to claim 9, wherein the synchronization control unit sequentially transmits a synchronization control signal to different radio control units among the plurality of radio control units at a predetermined time interval required when a radio frame transmitted from the radio terminals are maximum bands.

12. The band control system according to claim 9, wherein the band allocation control unit allocates the optical communication bands in a manner that a radio frame arrives at the slave station apparatuses from the radio transmitting/receiving units at the timings of the radio communication.

13. The band control system according to claim 9, wherein the radio communication timing calculating unit obtains the timing of the radio communication according to an amount of data to be acquired from the slave station apparatus by a master station apparatus which manages the slave station apparatus.

14. The band control system according to claim 9, wherein the band allocation control unit sets one cycle of the optical communication band allocated to each of the slave station apparatuses as one group and divides the one cycle into a plurality of cycles, and wherein the slave station apparatuses are associated with the one group, while the number of associated slave station apparatuses corresponds to the number of divided cycles.

15. A band control apparatus which controls a communication band between a plurality of radio transmitting/receiving units connected to one or more radio terminals and a plurality of radio control units corresponding to the plurality of radio transmitting/receiving units, the band control apparatus comprising:

a band allocation control unit; and a synchronization control unit, wherein the radio control units each include a radio communication timing calculating unit configured to calculate a timing at which the one or more radio terminals perform radio communication, wherein the band allocation control unit obtains optical communication bands according to the timings of the radio communication calculated by the radio communication timing calculating units and allocates the optical communication bands to a plurality of slave station apparatuses corresponding to the radio transmitting/receiving units, and wherein the synchronization control unit performs control in a manner that synchronization is achieved among the plurality of radio control units.

16. A communication apparatus which is located between a plurality of radio transmitting/receiving units connected to one or more radio terminals and a plurality of radio control units corresponding to the plurality of radio transmitting/receiving units and which perform optical communication with a plurality of slave station apparatuses corresponding to the plurality of radio transmitting/receiving units, the communication apparatus comprising:

a band allocation control unit configured to obtain optical communication bands according to timings obtained by the radio control units at which the radio terminals perform radio communication, and configured to allocate the optical communication bands to the plurality of slave station apparatuses corresponding to the radio transmitting/receiving units; and a synchronization control unit configured to perform control in a manner that synchronization is achieved among the plurality of radio control units.

* * * * *